United States Patent
Park et al.

(10) Patent No.: US 8,244,925 B2
(45) Date of Patent: Aug. 14, 2012

(54) CIRCUIT BOARD AND LIQUID CRYSTAL DISPLAY INCLUDES CHANGING EDID INFORMATION

(75) Inventors: Dong-won Park, Cheonan-si (KR); Sang-keun Lee, Asan-si (KR); Jin-kyu Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1023 days.

(21) Appl. No.: 12/198,792

(22) Filed: Aug. 26, 2008

(65) Prior Publication Data

US 2009/0122033 A1 May 14, 2009

(30) Foreign Application Priority Data

Nov. 13, 2007 (KR) .................. 10-2007-0115620

(51) Int. Cl.
*G06F 5/00* (2006.01)
(52) U.S. Cl. ............ 710/10; 710/8; 710/9; 710/16; 710/17; 710/18; 710/19; 713/1; 713/2
(58) Field of Classification Search .......... 710/8–10, 710/16–19; 713/1, 2
See application file for complete search history.

(56) References Cited

U.S. PATENT DOCUMENTS

| | | | | |
|---|---|---|---|---|
| 7,366,886 | B2* | 4/2008 | Yoo | 713/1 |
| 2005/0120384 | A1* | 6/2005 | Stone et al. | 725/132 |
| 2008/0198128 | A1* | 8/2008 | Tsai et al. | 345/156 |
| 2008/0309584 | A1* | 12/2008 | Zhang | 345/5 |

OTHER PUBLICATIONS

"Display switch with dedicated extended display identification data information" Research Disclosure, Mason Publications, Hamshire, GB, vol. 508, No. 89, Aug. 1, 2006, p. 1092, XP007136552 XP007136552.*

* cited by examiner

*Primary Examiner* — Tammara Peyton
(74) *Attorney, Agent, or Firm* — Innovation Counsel LLP

(57) ABSTRACT

Provided are a circuit board that stores Extended Display Identification Data (EDID) information provided externally and a liquid crystal display (LCD) comprising the same. The liquid crystal display comprises a circuit board and a liquid crystal panel. The circuit board comprises a first connector which receives an externally provided video signal, a second connector which receives an externally provided EDID signal, a memory coupled to the second connector that receives and stores the EDID signal, and a timing controller which receives the video signal from the first connector and generates a video data voltage by using the EDID signal. The liquid crystal panel responds to the video data voltage and displays a video image.

18 Claims, 7 Drawing Sheets

FIG. 4

| PIN # | PIN NAME |
|---|---|
| P1 | Reserved |
| P2 | NC |
| P3 | NC |
| P4 | NC |
| P5 | NC |
| P6 | NC |
| P7 | NC |
| P8 | NC |
| P9 | NC |
| P10 | HPD |
| P11 | Reserved |
| P12 | Reserved |
| P13 | H_GND |
| P14 | ML_Lane3(n) |
| P15 | ML_Lane3(p) |
| P16 | H_GND |
| P17 | ML_Lane2(n) |
| P18 | ML_Lane2(p) |
| P19 | H_GND |
| P20 | ML_Lane1(n) |
| P21 | ML_Lane1(p) |
| P22 | H_GND |
| P23 | ML_Lane0(n) |
| P24 | ML_Lane0(p) |
| P25 | H_GND |
| P26 | AUX_CH (p) |
| P27 | AUX_CH (n) |
| P28 | H_GND |
| P29 | AUX_PWR |
| P30 | Reserved |

FIG. 5

| PIN # | PIN NAME |
|---|---|
| P1 | GND |
| P2 | GND |
| P3 | GND |
| P4 | VCC |
| P5 | VCC |
| P6 | VCC |
| P7 | Reserved |
| P8 | Reserved |
| P9 | Reserved |
| P10 | NC |
| P11 | NC |
| P12 | LPM |
| P13 | FPB |
| P14 | LED1 |
| P15 | LED2 |
| P16 | FP_GND |
| P17 | FP_PWR |
| P18 | BL_PWM |
| P19 | BL_GND |
| P20 | BL_On_Off |

CIRCUIT BOARD AND LIQUID CRYSTAL DISPLAY INCLUDES CHANGING EDID INFORMATION

CROSS REFERENCE TO RELATED APPLICATION

This application claims priority from Korean Patent Application No. 10-2007-0115620 filed on Nov. 13, 2007 in the Korean Intellectual Property Office, the disclosure of which is incorporated herein by reference in its entirety.

BACKGROUND OF THE INVENTION

1. Field of the Invention

The present invention relates to a circuit board and a liquid crystal display comprising the same. More particularly, the present invention relates to a circuit board that stores externally provided Extended Display Identification Data (EDID) information and a liquid crystal display comprising the same.

2. Description of the Related Art

A liquid crystal display comprises a liquid crystal panel. The liquid crystal panel comprises a first plate comprising a pixel electrode, a second plate comprising a common electrode, and liquid crystal molecules with dielectric anisotropy that are injected between the first plate and the second plate.

By forming an electric field between the pixel electrode and the common electrode, controlling the intensity of the electric field, and controlling the amount of light penetrating the liquid crystal panel, a desired image is displayed. Here, since the liquid crystal display is not a self-luminating display device, a backlight unit operating as a light source is installed in the back of the liquid crystal panel.

In order to drive the liquid crystal display, all of the following components need to be electrically connected: the liquid crystal panel, a plurality of driving ICs to provide signals required to display images, the backlight unit, an inverter, a voltage supplier to provide source voltages, and a plurality of transmit cables to transmit video and audio signals from the external devices.

For the electrical connections, LVDS (Low Voltage Differential Signaling) has been widely used as an internal interface standard. For the external interface standard, VGA (Video Graphics Array) and DVI (Digital Video/Visual Interactive) have been widely used.

In the conventional interface standard of LVDS or DVI, Extended Display Identification Data (EDID) information is stored in a scaler board. Here, EDID information comprises display resolutions of a monitor, horizontal frequency, vertical frequency, a manufacture identifier, a model identifier, and a serial number.

Recently, a new standard that implements a simplified electrical connection with more colors, higher resolution, and a faster refresh ratio is under investigation by the VESA (Video Electronics Standards Association), which establishes standards about displays. As one of the new standard candidates, a digital display interface called "DisplayPort" has received significant attention.

DisplayPort is an interface that can transmit high quality video and audio signals and is capable of a maximum transmission speed of 10.8 Gbps with one cable. Also, an optional functionality to protect transmitted content can be used. As previously stated, EDID information can be stored in a scaler board in the conventional interface standard. But, since the scaler board is removed in the DisplayPort interface, a new structure is required to store EDID information.

SUMMARY OF THE INVENTION

Aspects of the present invention provide a circuit board to store EDID information provided externally.

Aspects of the present invention also provide a liquid crystal display that stores EDID information provided externally.

However, the aspects of the present invention are not restricted to those set forth herein. The above and other aspects of the present invention will become more apparent to one of ordinary skill in the art to which the present invention pertains by referencing the detailed description of the present invention given below.

According to an aspect of the present invention, there is provided a circuit board comprising a first connector which receives an externally provided video signal, a second connector which receives an externally provided Extended Display Identification Data (EDID) signal, and a memory coupled to the second connector to receive and store the EDID signal. The circuit board receives the externally provided video signal and the EDID signal, and stores the EDID signal.

According to another aspect of the present invention, there is provided a liquid crystal display comprising a circuit board and a liquid crystal panel. The circuit board comprises a first connector which receives an externally provided video signal, a second connector which receives an externally provided Extended Display Identification Data (EDID) signal, a memory coupled to the second connector to receive and store the EDID signal, and a timing controller which receives the video signal from the first connector and generates a video data voltage by using the EDID signal. The liquid crystal panel responds to the video data voltage and displays a video image.

BRIEF DESCRIPTION OF THE DRAWINGS

The above and other features and advantages of the present invention will become apparent by describing in detail exemplary embodiments thereof with reference to the attached drawings in which:

FIG. 4 is a table illustrating a pin structure of the first connector 400 shown in FIG. 1;

FIG. 5 is a table illustrating the pin structure of a second connector 500 shown in FIG. 1;

DETAILED DESCRIPTION OF THE INVENTION

Figure 1:
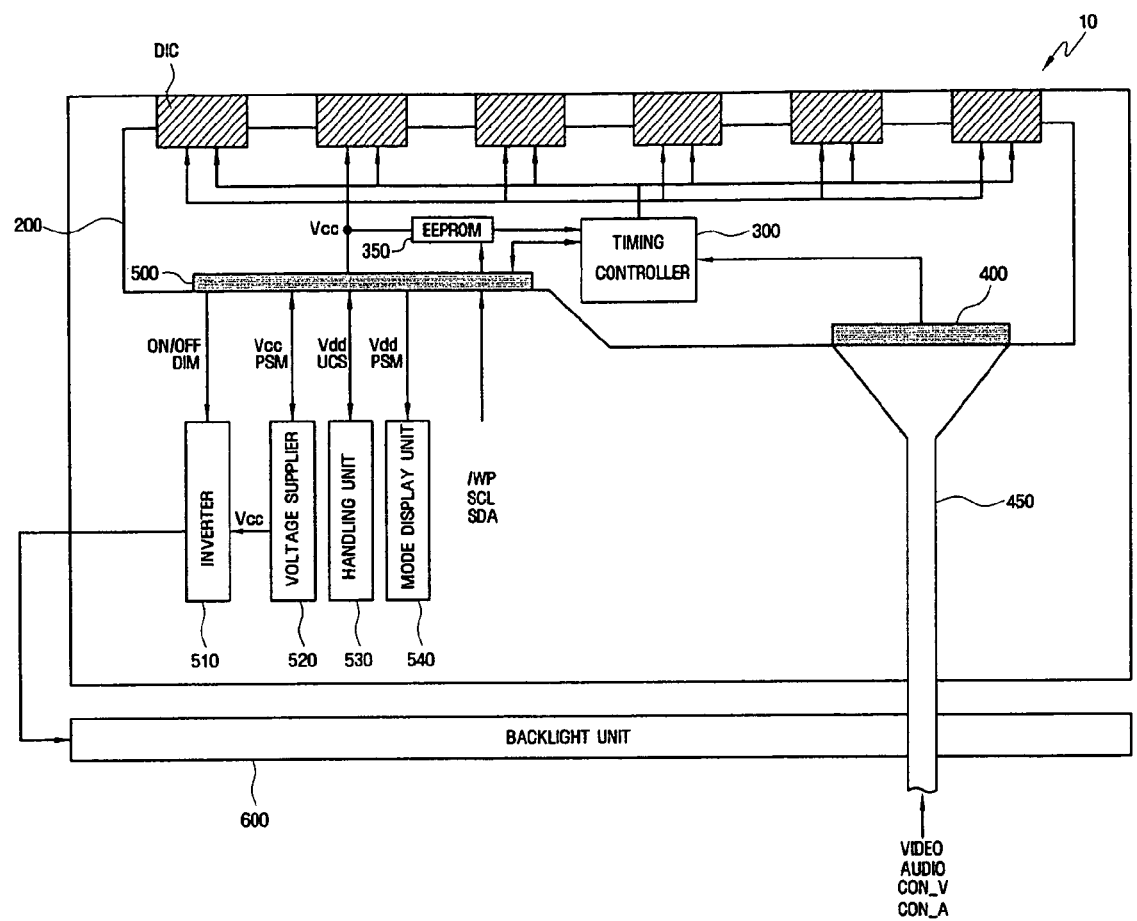
FIG. 1 is a block diagram illustrating a circuit board and a liquid crystal display comprising the same according to an exemplary embodiment of the present invention.

Advantages and features of the present invention and methods of accomplishing the same will be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. Like numbers refer to like elements throughout. As used herein, the term "and/or" comprises any and all combinations of one or more of the associated listed items.

It will be understood that, although the terms first, second, etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of the present invention.

The terminology used herein is for the purpose of describing particular embodiments only and is not intended to limit the invention. As used herein, the singular forms "a", "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless explicitly stated otherwise, all of the terminologies (including technical and scientific terminologies) used herein may be used with a meaning so that those skilled in the art can commonly understand. Further, terminologies defined in ordinary dictionaries should not be ideally or excessively construed, unless explicitly stated otherwise.

Hereinafter, a circuit board and a liquid crystal display comprising the same according to an exemplary embodiment of the present invention is described by referring to FIGS. 1 through 7.

Figure 2:
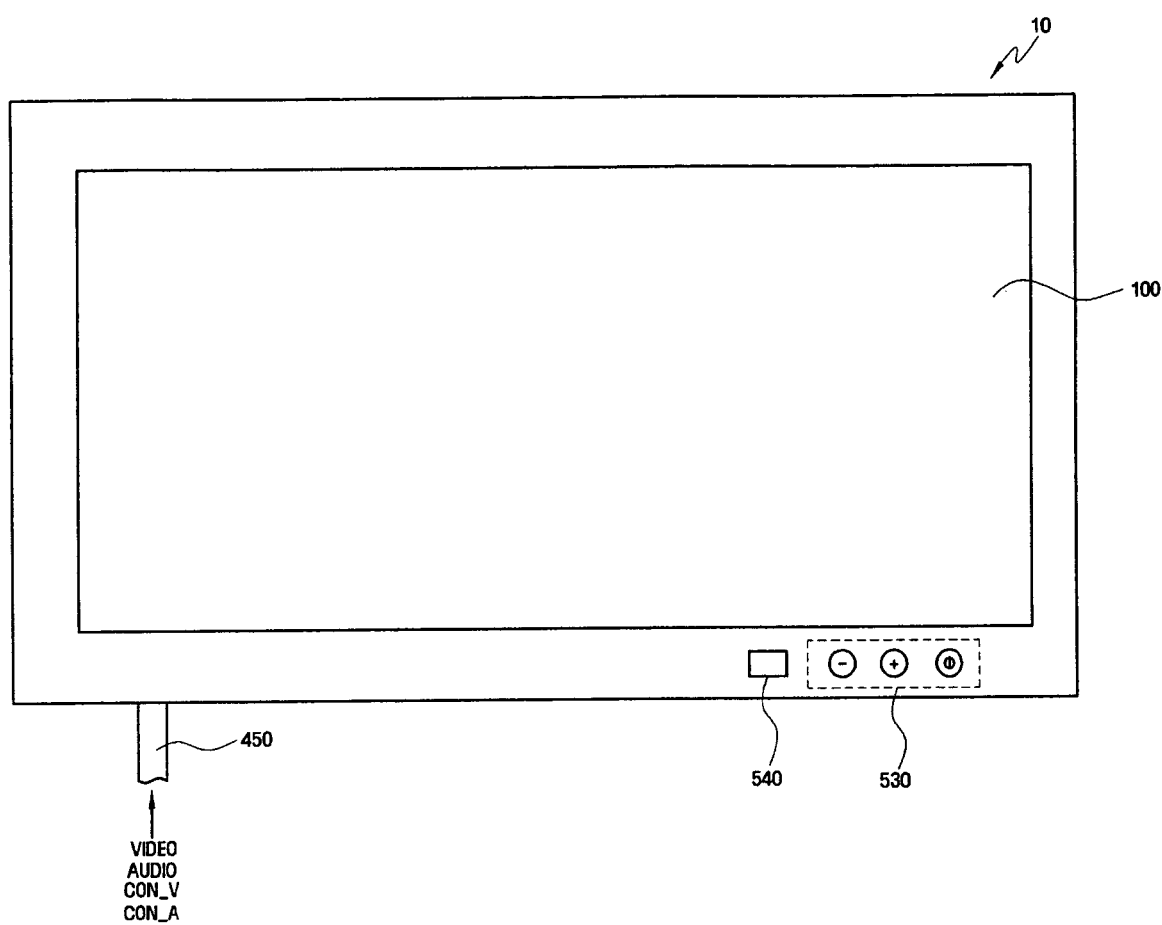
FIG. 2 is a front view illustrating the liquid crystal display shown in FIG. 1.

FIG. 1 is a block diagram illustrating a circuit board and a liquid crystal display comprising the same according to the exemplary embodiment of the present invention. FIG. 2 is a front view illustrating the liquid crystal display shown in FIG. 1.

Referring to FIGS. 1 and 2, a liquid crystal display 10 according to the exemplary embodiment of the present invention comprises a liquid crystal panel 100, a circuit board 200, and internal modules 510, 520, 530, 540.

The liquid crystal panel 100 comprises multiple gate lines (not shown), multiple data lines (not shown), and multiple pixels (not shown) formed in an area where the multiple gate lines (not shown) and the multiple data lines (not shown) are crossed, which are all structures well known to those skilled in the art and accordingly require no explanation. The liquid crystal panel 100 displays video by responding to a video data voltage DATA_V provided by a data-driving circuit DIC and a gate-driving circuit (not shown).

The circuit board 200 comprises driving circuits (not shown), a first connector 400, a second connector 500, a memory 350, and a timing controller 300. The memory 350 can be a EEPROM as shown FIG. 1. This will be further described later.

The driving circuits (not shown) are installed on the circuit board 200, and generate signals to drive the liquid crystal display 10. For example, the gate-driving circuit (not shown) and the data-driving circuit DIC are connected to the liquid crystal panel 100, and generate gate signals and the video data voltage DATA_V to display video, respectively. FIG. 1 illustrates an example where the data-driving circuit DIC which is implemented as an integrated circuit is connected to the liquid crystal panel 100, and the gate-driving circuit (not shown) is installed on the liquid crystal panel 100. However, the forms of the data-driving circuit DIC and the gate-driving circuit (not shown) are not limited.

The circuit board 200 which comprises the first connector 400 and the second connector 500 and the liquid crystal display 10 which comprises the circuit board 200 are connected to an external device (not shown) through the first connector 400. Internal modules are interfaced with each other through the second connector 500 to which the internal modules are connected with.

The first connector 400 receives externally provided VIDEO, AUDIO, and/or control signals CON_V, CON_A to the circuit board 200. The first connector 400 can be connected to an external host device (not shown), for example, a transmission cable 450 to transmit the VIDEO, the AUDIO, and/or the control signals CON_V, CON_A generated from a computer.

Here, the video control signal CON_V can be a signal to control video luminance, and the audio control signal CON_A can be a signal to control audio volume. Also, the control signals CON_V, CON_A can be a Monitor Control Command Set (MCCS) standardized by the Video Electronics Standards Association (VESA). A detailed description of the first connector 400 is described later by referring to FIGS. 3 and 4.

The second connector 500 is connected to modules of the liquid crystal display 10 and provides an interface to modules connected to the second connector 500. The timing controller 300, the inverter 510, the voltage supplier 520, the handling unit 530, and the mode display unit 540 can all be electrically connected to each other and operated through the second connector 500. The detailed description of the second connector 500 is described later by referring to FIG. 5.

The second connector 500 receives the externally provided Extended Display Identification Data (EDID) signals SCL, SDA to the circuit board 200. Also, the second connector 500 can receive the externally provided write protection signal /WP to the circuit board 200. The EDID signals SCL, SDA and the write protection signal /WP are described later with the principles of storing EDID information in a circuit board and a liquid crystal display comprising the same according to exemplary embodiments of the present invention.

The memory 350 is connected to the second connector 500, and stores EDID information. The memory 350 can comprise a first EDID information block that stores the first EDID information and a second EDID information block that stores the second EDID information.

Here, the EDID information is information for a display system that identifies the liquid crystal display 10. The display system reads EDID information stored in the memory 350, and then identifies the liquid crystal display 10 with the EDID information.

The EDID information can be categorized into the first EDID information and the second EDID information. The first EDID information comprises display variables and characteristics such as display resolutions of a monitor, horizontal frequency, vertical frequency, color information, maximum image size, and frequency range limitation. The second EDID information comprises manufacture identifier, model identifier, and serial number. In terms of manufacture information, the first EDID information comprises information of the panel makers, and the second EDID information comprises information of the monitor set makers.

In a circuit board and a liquid crystal display comprising the same according to the exemplary embodiments of the present invention, EDID information can be stored by an EDID signal that is provided through the second connector 500. The EDID signal comprises the EDID data signal SDA and the EDID information including the EDID clock signal SCL. Details are described later with the principles of storing EDID information in a circuit board and a liquid crystal display comprising the same according to the exemplary embodiments of the present invention.

The memory 350 can be composed of non-volatile memories, especially EEPROM (Electrically Erasable Programmable Read-Only Memory). Using EEPROM, information stored in the memory 350 can be maintained in a stable condition for a long time, and users can repetitively modify information written in the memory. Also, information can be modified when the EEPROM is embedded into a system.

If the memory 350 is composed of EEPROMs, a serial interface to minimize the number of input and output pins can be used as an interface to write EDID information into the EEPROM.

Here, $I^2C$ (I-squared-C) or SPI (serial peripheral interface) can be used as a serial interface. $I^2C$ is an interface specification proposed by Philips that uses two lines including a clock signal line and a data line. SPI is a serial interface specification that uses a clock signal line, a strobe line, and one or two data lines.

The timing controller 300 takes VIDEO and AUDIO, and the control signals CON_V, CON_A delivered by the first connector 400 as inputs, and outputs video data voltage DATA_V and audio data voltage DATA_A by using EDID signals. The timing controller 300 provides data-driving circuit DIC and the gate-driving circuit (not shown) with video data voltage DATA_V and the liquid crystal panel 100 displays video by means of the data-driving circuit DIC and the gate-driving circuit (not shown).

The internal modules 510, 520, 530, 540 comprise the voltage supplier 520, the inverter 510, the handling unit 530, and the mode display unit 540.

The voltage supplier 520 is connected to the second connector 500, generates source voltage Vcc using an externally provided voltage, and provides the circuit board 200 with the generated source voltage Vcc through the second connector 500. Specifically, the voltage supplier 520 provides the memory 350, the timing controller 300, the data-driving circuit DIC, and other circuits installed on the circuit board 200 with the source voltage Vcc through the second connector 500.

The voltage supplier can interface to the timing controller 300 through the second connector 500. The timing controller 300 can provide the voltage supplier 520 with a power save mode (PSM) signal through the second connector 500. Here, the PSM signal can be a signal to disconnect the source voltage Vcc provided to a backlight unit 600 in order to reduce power consumption. If the voltage supplier 520 receives the PSM signal, it can stop providing the backlight unit 600 with the source voltage Vcc.

The inverter 510 is connected to the second connector 500 and can interface to the timing controller 300. The inverter 510 can take backlight on/off signals and dimming signals DIM from the timing controller 300 as input and can control the on/off state and the luminance of the backlight unit 600.

The handling unit 530 can be connected to the second connector 500, and can interface to the timing controller 300. The handling unit 530, as shown in FIG. 2, can be equipped with buttons on the front of the liquid crystal display 10, and user command signals (UCS) can be generated based on user handling of the buttons. The user command signals can be delivered to the timing controller 300 through the second connector 500. The timing controller 300 transforms the user command signals into signals such as backlight on/off signals or a dimming signal DIM, and also provides the inverter 510 through the second connector 500.

The mode display unit 540 is connected to the second connector 500, and can interface to the timing controller 300. Specifically, by taking the power save mode (PSM) signal from the timing controller 300 through the second connector 500 as input, the mode display unit 540 can display even if the liquid crystal display 10 is in a power save mode.

The liquid crystal display 10 according to the exemplary embodiment of the present invention can further comprise the transmission cable 450. The transmission cable 450 is connected to the first connector 400. The transmission cable 450 comprises a main link to transmit video signals and an auxiliary channel to transmit control signals. The details of the transmission cable 450 are described later by referring to FIGS. 3 and 4.

Figure 3:
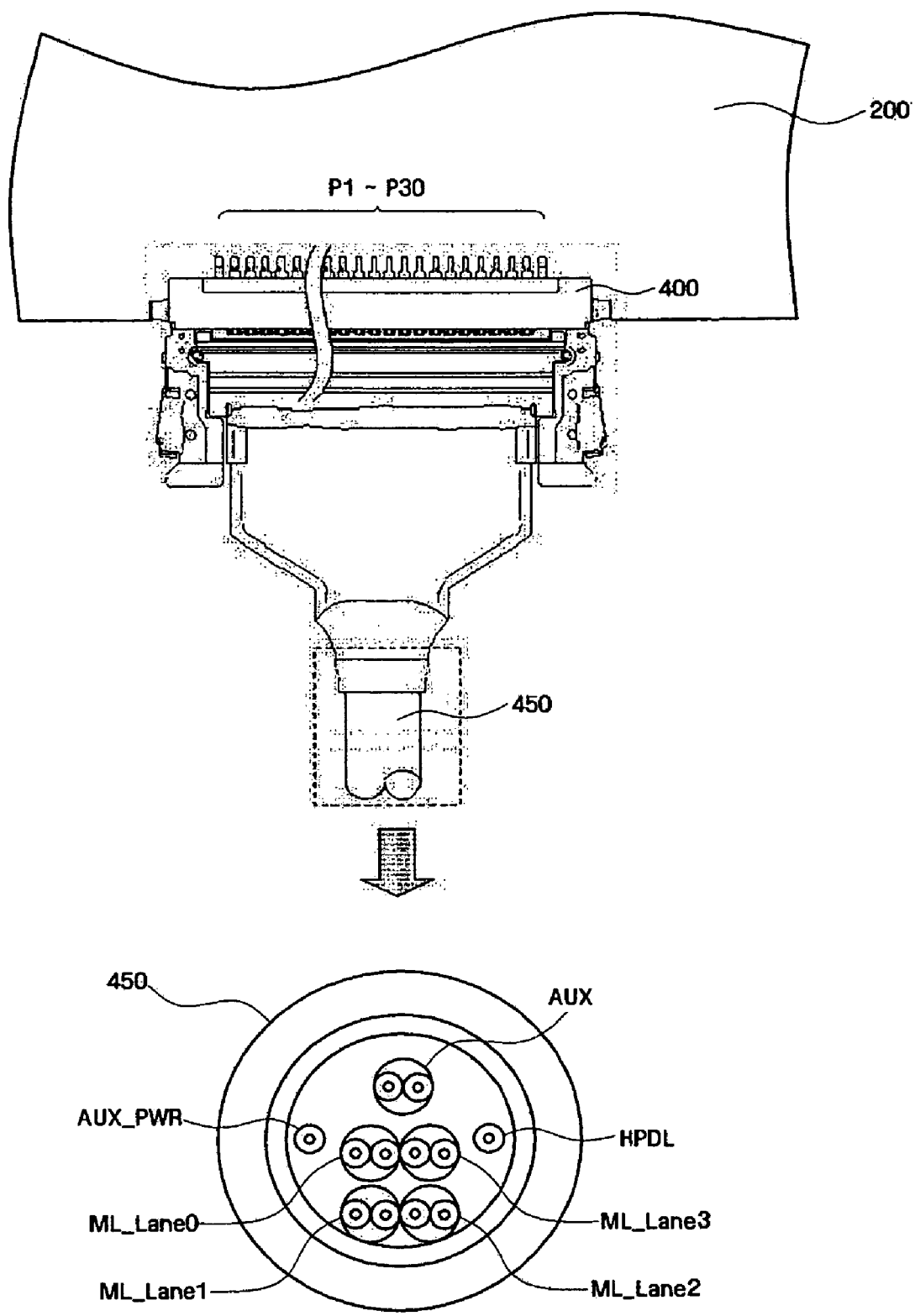
FIG. 3 is a plan view and a sectional view illustrating in greater detail the first connector 400 and the transmission cable 450 shown in FIG. 1.

FIG. 3 is a plan view and a sectional view illustrating the first connector 400 and the transmission cable 450 shown in FIG. 1. FIG. 4 is a table illustrating a pin structure of the first connector shown in FIG. 1.

Referring to FIGS. 3 and 4, the first connector 400 and the transmission cable 450 shown in FIG. 1 are described in detail. Hereinafter, although the first connector 400 has 30 pins, and the transmission cable 450 is used for DisplayPort, the present invention is not limited to those examples.

Referring to FIG. 3, the transmission cable 450 is connected to the first connector 400. The transmission cable comprises four pairs of main links, ML_Lane0, ML_Lane1, ML_Lane2, ML_Lane3, one pair of an auxiliary channel AUX, a hot plug detect line HPDL, and a auxiliary power line AUX_PWR. Video and audio signals VIDEO, AUDIO are transmitted through the main links ML_Lane0, ML_Lane1, ML_Lane2, ML_Lane3, and a (Monitor Control Command Set) MCCS signal can be transmitted through the auxiliary channel AUX. Such a transmission cable 450 is connected to each of the pins P1-P30 as illustrated in FIG. 4.

Referring to FIG. 4, Pins 2 through 9, P2-P9, are in a "no connect" state (No Connect, hereinafter it is called "NC"). Pin 10 (P10) is a hot plug detect (HPD) pin and is connected to the hot plug detect line (HPDL). Pin 13 (P13), Pin 16 (P16), Pin 19 (P19), Pin 22 (P22), Pin 25 (P25), and Pin 28 (P28) are ground pins H_GND, and ground voltage is applied for the main links ML_Lane0, ML_Lane1, ML_Lane2, ML_Lane3. Pin 29 (P29) is an auxiliary power pin and is connected to the auxiliary power line, AUX_PWR. Pin 1 (P1), Pin 11 (P11), Pin 12 (P12), and Pin 30 (P30) are reserved pins "Reserved", and can be used in the future by the VESA. Pin 14 (P14), Pin 15 (P15), Pin 17 (P17), Pin 18 (P18), Pin 20 (P20), Pin 21 (P21), Pin 23 (P23), and Pin 24 (P24) are main link lane pins ML_Lane0(n), ML_Lane0(p), ML_Lane1(n), ML_Lane1 (p), ML_Lane2(n), ML_Lane2(p), ML_Lane3(n), ML_Lane3(p), and are connected to the four pairs of the main links ML_Lane0, ML_Lane1, ML_Lane2, ML_Lane3. Pin 26 (P26) and Pin 27 (P27) are auxiliary channel pins AUX_CH(n), AUX_CH(p) connected to the pair of auxiliary channels.

FIG. 5 is a table illustrating a pin structure of the second connector shown in FIG. 1.

Referring to FIG. 5, the second connector 500 shown in FIG. 1 is described in detail. Hereinafter, although the second connector has 20 pins, the present invention is not limited to this example.

Referring to FIG. 5, Pins 1 through 3 (P1-P3) are ground pins GND, and ground voltage is applied to those pins. Pins 4 through 6 (P4-P6) are source voltage pins VCC, and source voltage Vcc is applied to these pins by having a connection to the voltage supplier 520. Pins 7 through 9 (P7-P9) are reserved pins, "Reserved" and can be used in the future by the VESA. Pin 10 (P10) and pin 11 (P11) are "No Connect" pins, NC. Pin 12 (P12) is a low power mode (LPM) pin, and takes the power save mode (PSM) signal generated by the timing controller 300 as input, and is also connected to the voltage supplier 520. Pin 13 is a front panel button (FPB) pin, connected to the handling unit 530, and takes a user command signal (UCS) generated by the handling unit 530 as input. Pin 14 (P14) and pin 15 (P15) are light emitting diode (LED) pins LED1, LED2, connected to the mode display unit 540, and both pins take the power save mode (PSM) signal as input. Pin 16 (P16) is a front panel ground pin, FP_GND, and a ground voltage for the handling unit 530 and the mode display unit 540 is applied. Pin 17 (P17) is a front panel power pin, FP_PWR, connected to the handling unit 530 and the mode display unit 540, and takes a source voltage Vdd to drive the handling unit 530 and the mode display unit 540. Pin 18 (P18) is a diming pin, BL_PWM, connected to the inverter 510, and a dimming signal DIM such as a pulse width modulation (PWM) signal is applied. Pin 19 (P19) is a backlight ground pin, BL_GND, connected to the inverter 510, and a ground voltage for the inverter 510 is applied. Pin 20 (P20) is a backlight on/off pin, BL_On_Off, connected to the inverter 510, and a backlight on/off signal ON/OFF is applied.

In a liquid crystal display according to the exemplary embodiments of the present invention, three pins from the reserved pins "Reserved" or "No Connect" pins NC can be assigned to an SCL pin, an SDA pin, and a /WP pin, respectively. The EDID data signal SDA is applied to the SDA pin. The EDID clock signal SCL is applied to the SCL pin. The external write protection signal /WP is applied to the /WP pin. Here, the write protection signal /WP is a signal that indicates the possibility of a memory write operation. The SCL, SDA, and /WP pins are connected to the memory 350.

Figure 6:
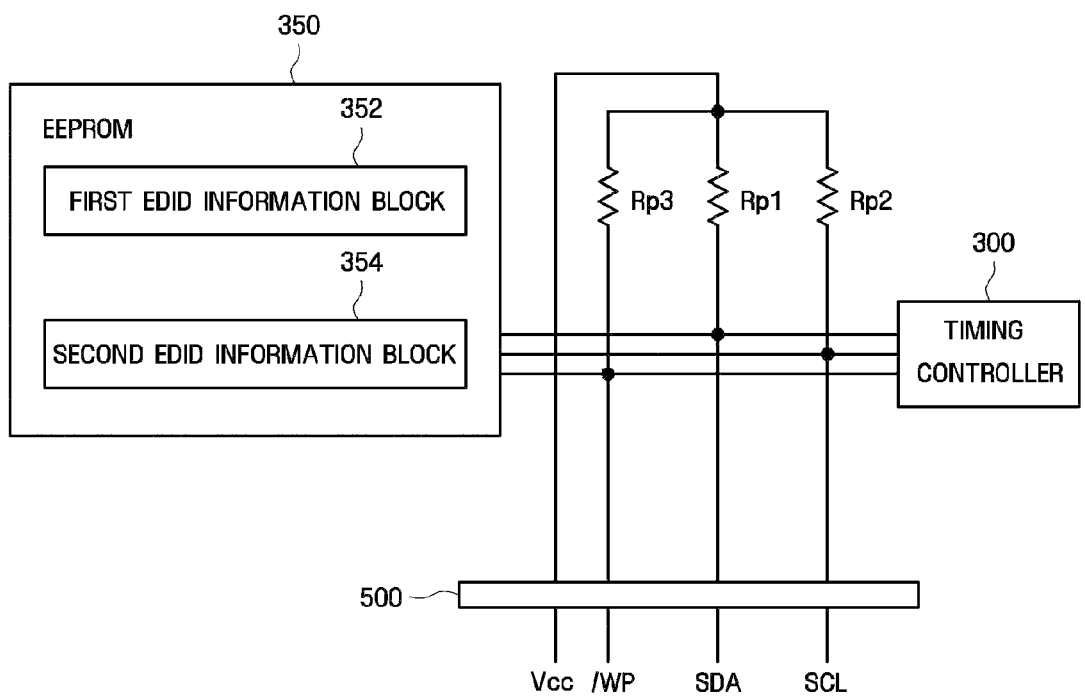
FIG. 6 is a conceptual diagram illustrating principles of storing EDID information in a circuit board and a liquid crystal display comprising the same according to an exemplary embodiment of the present invention.
Figure 7:
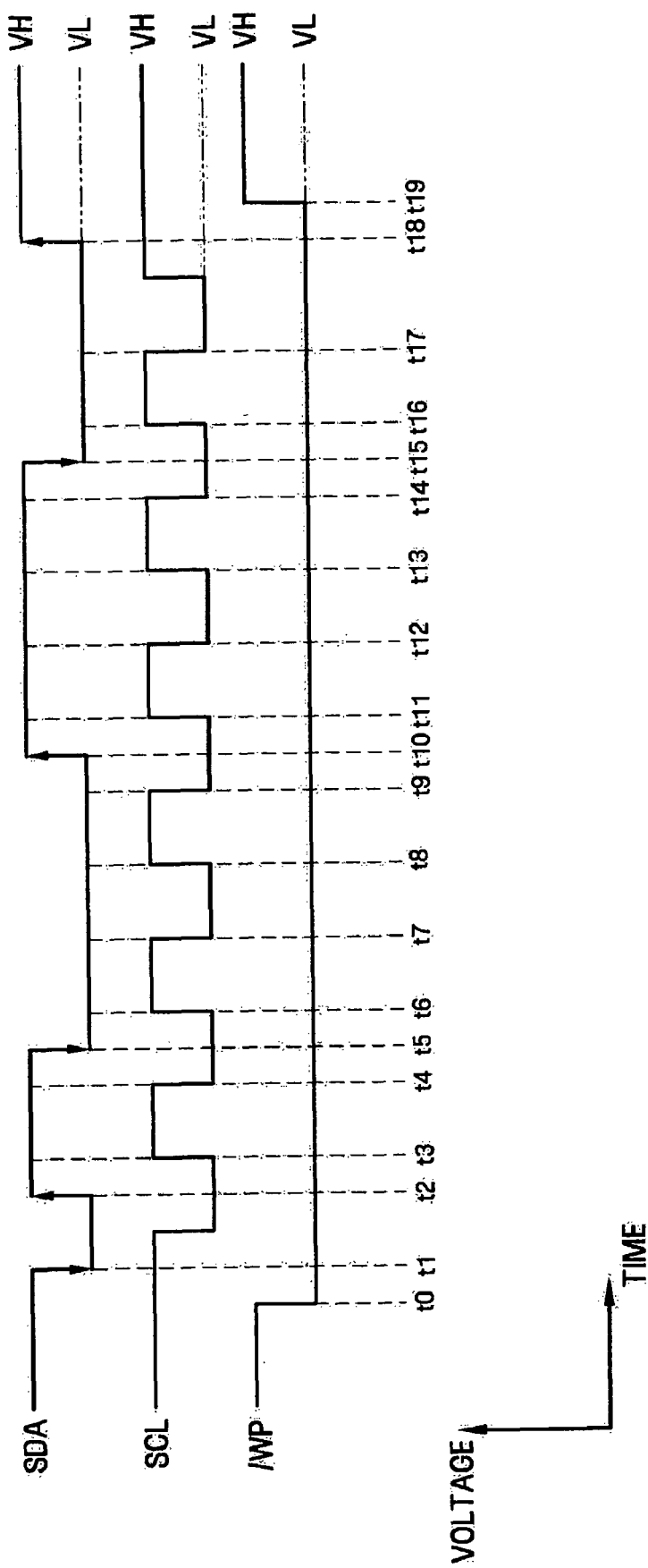
FIG. 7 is a timing diagram of signals associated with the lines which are identified in FIG. 6 to store EDID information.

FIG. 6 is a conceptual diagram illustrating principles of storing EDID information in a circuit board and a liquid crystal display comprising the same according to the exemplary embodiment of the present invention. FIG. 7 is a timing diagram of the signals associated with the lines which are identified in FIG. 6 for storing EDID information.

Referring to FIGS. 6 and 7, in a circuit board and a liquid crystal display comprising the same according to an exemplary embodiment of the present invention, the principles of storing EDID information are described.

Referring to FIG. 6, a second connector 500 can comprise a first pin P1, a second pin P2, a third pin P3, and a fourth pin P4. The source voltage Vcc is applied to the first pin P1. A write protection signal /WP is applied to the second pin P2. An external EDID data signal SDA is applied to the third pin P3. An external EDID clock signal SCL is applied to the fourth pin P4.

A circuit board and a liquid crystal display comprising the same according to the exemplary embodiments of the present invention can comprise a pullup resistor Rp3 between an input terminal which the source voltage is applied to and an input terminal which the memory write protection signal /WP is applied to. The pullup resistor Rp3 prevents a memory 350 from being written with undesired data by pulling up the input terminal voltage with the Vcc.

Referring to FIG. 7, by using an I$^2$C interface, an example of storing second EDID information into a second EDID information block 354 is described. Hereinafter, "VH" state means "Voltage High" or a high level of voltage, and "VL" state means "Voltage Low" or a low level of voltage.

The I$^2$C interface performs serial data communications using two lines such as a SCL (Serial Clock Line) and a SDL (Serial Data Line), which is called an I$^2$C bus. The SCL transmits a synchronous clock signal SCL, and the SDL transmits bit information of data. The pullup resistors Rp1, Rp2 connected to each of the two lines are maintained in a VH state during initialization.

First, the /WP is set to a VL state to enable the writing of information to the EEPROM 350. By so setting the /WP to the "protection disabled" state, the second EDID information can be written to the second EDID information block 354 of the EEPROM 350.

Next, transmission is initiated by generating a start signal which indicates the start of transmission. When the SDA goes from VH to VL during the VH state of the SCL, it can be interpreted as a start signal. In FIG. 7, the start signal is detected at time t1.

Then, data is transmitted. To represent one bit-data including 0 and 1, the state of the SDA signal change during the SCL is in the VL state. The state of the SDA signal during the SCL signal to the VH state is interpreted as a 0 or 1. When the SCL is in the state of VH, the data is determined as 1 if the SDA signal is in the VH level, and the data is determined as 0 if the SDA signal is in the VL level. Referring to FIG. 7, a 1 during the time period t3-t4, a 0 during the time period t6-t7, a 0 during the time period t8-t9, a 1during the time period t11-t12, a 1 during the time period t13-t14, and a 0 during the time period t16-t17 are sequentially transmitted.

Next, the transmission is terminated by generation of a termination signal. The termination signal is to indicate the termination of data transmission, and the SDA signal level transition from VL to VH during the SCL state of VH is interpreted as the termination signal. Referring to FIG. 7, the termination signal is indicated at time t18.

Using such principles above, the externally provided EDID information can be stored in a circuit board and a liquid crystal display comprising the same according to the present invention. Specially, EDID information can be stored in a new display standard such as DisplayPort where the conventional board to store EDID information has been removed. Here, the first EDID information can be stored by a panel maker, and the second EDID information can be stored by a set maker externally. Also, EDID information can be modified at any time if needed.

While the present disclosure of invention has been particularly provided and described with reference to exemplary embodiments thereof, it will be understood by those of ordinary skill in the art in light of the foregoing that various changes in form and details may be made therein without departing from the spirit and scope of the present teachings.

What is claimed is:

1. A liquid crystal display (LCD) comprising:
a circuit board;
a first connector disposed on the circuit board and configured to receive an externally provided video signal;
a second connector disposed on the circuit board and configured to receive an externally provided, one or more Extended Display Identification Data (EDID) signals;
a reprogrammble memory disposed on the circuit board and coupled to the second connector to receive a first of the EDID signals and to be programmed thereby when the reprogrammble memory is placed into a write-enabled mode by a supplied write-enabling signal;
a timing controller disposed on the circuit board and configured to receive the video signal from the first connector, the timing controller being configured to generate video data voltages based on the stored programming data conveyed by the first of the EDID signals;
a liquid crystal panel, operatively coupled to the circuit board and configured to respond to the generated video data voltages so as to thereby display a corresponding video image; and wherein the second connector has a plurality of terminals including a first terminal to which the source voltage is applied to and a second an input terminal to which the write protection signal memory is applied and a pullup resistor is interposed between the first and second terminals.

2. The LCD of claim 1, wherein the EDID signals can provide storable EDID information of different categories and the memory comprises first and second storage blocks where the storable EDID information of at least first and second categories is respectively storable.

3. LCD of claim 1, wherein the memory is an EEPROM.

4. The LCD of claim 1, wherein the EDID signals can include an EDID data signal.

5. The LCD of claim 4, wherein the EDID signals can further include an EDID clock signal to which the EDID data signal is synchronized.

6. The LCD of claim 1, wherein, when the reprogrammble memory is placed into the write-enabled mode, the data of the first EDID signal that is written to the memory, is obtained through the use of an I2 C (I-squared-C) interface protocol.

7. The LCD of claim 1, wherein the second connector receives a write protection signal that determines whether the reprogrammble memory is placed or not into the write-enabled mode.

8. The LCD of claim 1, further comprising a voltage supply connected to the second connector, wherein the voltage supply generates a source voltage using an externally provided voltage and transmits the source voltage to the circuit board through the second connector.

9. The LCD of claim 8, wherein the second connector receives a write protection signal that determines whether the reprogrammble memory is placed or not into the write-enabled mode.

10. The LCD of claim 1, further comprising a transmission cable connected to the first connector, wherein the first connector transmits an externally applied control signal and wherein the transmission cable comprises a main link wire to transmit the video signal and an auxiliary channel wire to transmit a control signal, wherein the control signal is a Monitor Control Command Set (MCCS) signal.

11. A circuit board for use with a video display device, the circuit board comprising:
a first connector disposed on the circuit board and configured to receive an externally provided video signal;
a second connector disposed on the circuit board and configured to receive an externally provided, one or more Extended Display Identification Data (EDID) signals; and
a reprogrammble memory disposed on the circuit board and coupled to the second connector to receive a first of the EDID signals and to be programmed thereby when the reprogrammble memory is placed into a write-enabled mode by a supplied write-enabling signal,
wherein the circuit board is configured to further receive an externally provided write-enabling signal which determines whether the reprogrammable memory is placed or not into the write-enabled mode; and wherein the second connector has a plurality of pins including a second pin to which the source voltage is applied to and a third pin terminal to which the write protection signal, is applied to, and a fourth pin which a source voltage from the outside of the circuit board is applied to and wherein at least one pullup resistor is interposed between the first pin and at least one of the second, third and fourth pins.

12. The circuit board of claim 11, wherein the EDID signals can provide storable EDID information of different categories and the memory comprises first and second storage blocks where the storable EDID information of at least first and second categories is respectively storable.

13. The circuit board of claim 11, wherein the memory is an EEPROM.

14. The circuit board of claim 11, wherein the EDID signals can include an EDID data signal, and the second connector comprises a first pin to which the externally provided EDID data signal is applied.

15. The circuit board of claim 14, wherein the EDID signals can include an EDID clock signal to which the EDID data signal is synchronized, and the second connector comprises a second pin to which the externally provided EDID clock signal is applied.

16. The circuit board of claim 15, wherein, when the reprogrammble memory is placed into the write-enabled mode, the data of the first EDID signal that is written to the memory, is obtained through the use of an I2 C (I-squared-C) interface protocol.

17. The circuit board of claim 14, wherein the second connector comprises a second pin that a write protection signal is applied to, wherein the write protection signal determines whether the reprogrammble memory is placed or not into the write-enabled mode.

18. The circuit board of claim 14, wherein the second connector comprises a second pin that a source voltage from the outside of the circuit board is applied to.

* * * * *